United States Patent Office 2,904,975
Patented Sept. 22, 1959

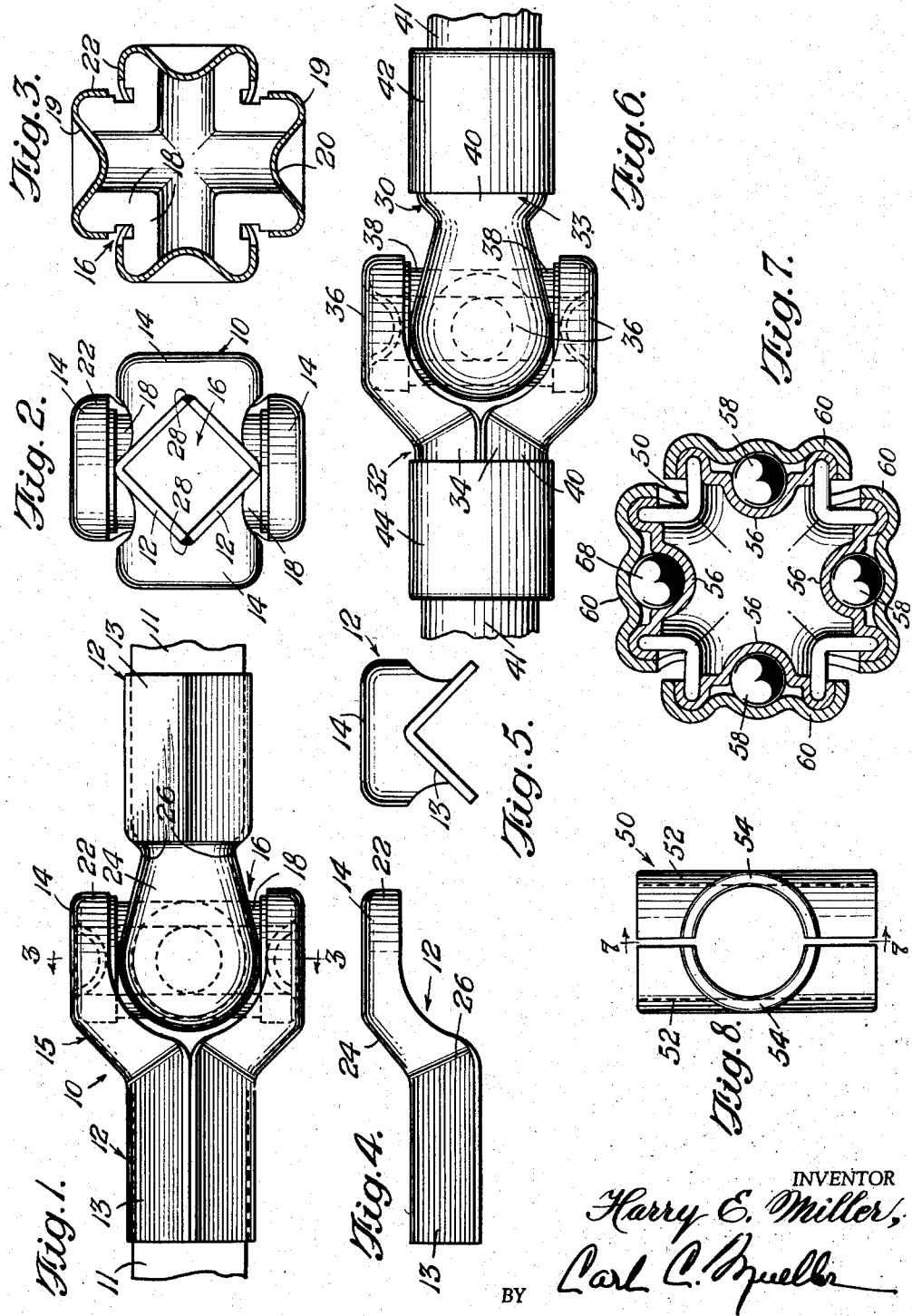

2,904,975

UNIVERSAL JOINT

Harry E. Miller, Germanton, N.C.

Application July 1, 1957, Serial No. 669,167

4 Claims. (Cl. 64—17)

This invention relates to universal joints. More particularly, the invention relates to an improvement in universal joints employed as torque transmitting couplings for power shafts, and methods of making such joints.

The widespread use of universal joints as torque transmitting couplings for power shafts on many types of machinery has naturally engendered considerable development work in the construction of such joints. However, the universal joint constructions proposed in the past have generally been unduly complex, and they have been undesirably expensive for use on certain types of machinery. One of the major factors in the high cost of the universal joint structures available heretofore has been the need for extensive machining operations in their fabrication. Particularly for use on simple farm machinery, a need has existed for a simplified universal joint structure capable of being easily and cheaply manufactured and assembled.

An object of the present invention is to provide new and improved universal joints and methods of making such joints.

Another object of the invention is to provide an inexpensive, simplified universal joint structure capable of being easily and cheaply manufactured and assembled.

Still another object of the invention is to provide new and improved methods of constructing and assembling universal joints employed as torque transmitting couplings for power shafts.

Other objects, and the nature and advantages of the invention, will become apparent from the following detailed description of specific embodiments thereof, when considered in conjunction with the accompanying drawing, wherein:

Fig. 1 is a side elevation view of a universal joint embodying the invention;

Fig. 2 is an end view of the joint shown in Fig. 1;

Fig. 3 is a transverse vertical section taken along line 3—3 of Fig. 1;

Fig. 4 is a side elevation view of a half-yoke member employed in the construction of the joint shown in Figs. 1, 2 and 3;

Fig. 5 is an end view of the half-yoke member shown in Fig. 4;

Fig. 6 is a side elevation view of a universal joint embodying a first modification of the invention;

Fig. 7 is a transverse vertical section of a universal joint embodying a second modification of the invention, and Fig. 8 is an end view of a cross-shaped coupling insert for the universal joint illustrated in Fig. 7.

In accordance with the present invention, the universal joint structure is simplified by employing only the minimum number of elements essential to form such a joint, and these elements are manufactured and assembled in a highly practical and inexpensive manner. An important feature of the invention is the fabrication of the elements of the joint by simply stamping them from sheet metal, thereby eliminating expensive machining operations.

In the embodiment of the invention illustrated in Figs. 1, 2 and 3, a pair of yokes generally designated 10 engage and couple the adjacent ends of a pair of power shafts 11, of which one may be the driving shaft and the other the driven shaft. Each yoke 10 is formed by mating a pair of cooperating half-yoke members 12, which are provided at one end thereof with a shank portion 13 for snugly covering and tightly engaging the power shafts 11. At their other end, each of the half-yoke members 12 is provided with an offset head 14. The heads 14 of each pair of half-yoke members 12 cooperate to form bifurcated ends 15 which pivotally engage a cross-shaped coupling 16 inserted between the yokes 10. The bifurcated ends 15 of the yokes 10 are disposed in interfitting relationship at right angles to each other and in engagement with opposite sides of the coupling 16, as is best shown in Fig. 1.

The cross-shaped coupling 16 has four tubular arms 18 which project outwardly at right angles to each other to form its cross-shaped configuration. The arms 18 function as two pairs of aligned trunnions disposed in intersecting planes, as is best shown in Fig. 3, and the bifurcated ends 15 of the yokes 10 function as bearings for these trunnions. Each of the pair of yokes 10 is swingable in only one plane, but the combined motion of the two yokes results in a true universal joint. By way of example, one of the yokes 10 is shown in Fig. 1 as being movable through an angle of about 22½° from its full line position to its dotted line position. This arrangement provides sufficient freedom of movement for most purposes, and only minor structural changes are required to increase the maximum angle of movement.

In order to provide bearing surfaces for the joint, the outer ends of each of the tubular arms 18 are rounded in cross-section, and the offset heads 14 of the yokes 10 are each provided with a complementary rounded portion 19 surrounding a central semispherical indentation 20 which fits directly over the open end of each of the tubular arms 18. Of course, the shape of this indention and the curvature of the cooperating bearing surfaces may be varied, as desired, provided that an adequate torque load surface is available and friction is minimized. The outer edges of each rounded portion 19 terminate in a lip 22, which fits snugly around the peripheral end of each tubular arm 18 on three sides thereof, and on the fourth side thereof merges with an inclined bridge portion 24 connecting the shank portion 13 with the offset head 14 of each yoke 10. Opposite sides of each bridge portion 24 are provided with indentations 26 for reducing the width of the bridge portions 24 to increase the maximum angle of swinging movement of the yokes 10, and at the same time to form a snug fit on the adjacent ends of the power shafts 11.

It is evident that constant lubrication for the universal joint may be supplied by placing oil or grease within the hollow interior of the arms 18 of the coupling 16 prior to the assembly of the joint. Alternatively, suitable grease fittings may be provided for this purpose at appropriate locations on the joint.

Among the outstanding features of the invention are the ease and the cheapness of manufacturing and assembling such universal joints. Of particular importance is the fact that the half-yoke members 12 may be fabricated merely by stamping them from sheet metal. In such fabrication, each half-yoke member 12 may be completely formed in a simple stamping operation, in which it is cut from a metallic sheet or strip and simultaneously is bent into the desired final shape. Although it is preferred to employ heavy gage steel sheet metal for this purpose, other suitable materials may be substituted. For example, aluminum, brass, copper, etc., as well as various alloys and combinations thereof may sometimes be used. It is also contemplated that in some cases these members could be molded from certain plastic compositions capable of setting to form rigid and strong structures. Similarly, the cross-shaped coupling 16 may be fashioned from sheet metal sections, or it may be made by casting or molding suitable metals or plastics. In a few instances, such as when ball or thrust bearings are embodied in the joint, some machining of this coupling may be desired to form bearing seat surfaces thereon. However, in most cases, no machining operations are required for any portion of joints embodying the invention.

In assembling the joint, the structure is so simple that each complete universal joint requires only one coupling 16 and four of the identical half-yoke members 12 shown in Figs. 4 and 5. The four half-yoke members 12 are placed together to form two mated pairs of yokes, the coupling 16 is inserted between these yokes, and the heads of the yokes are brought into pivotal engagement with the trunnions of the coupling. The shank portions of the yokes are placed in encasing engagement with the adjacent ends of the power shafts 11, with the ends of these shafts abutting the indentations 26 at the inclined bridge portions 24 of the yokes 10. Then the half-yoke members are joined together along the shank portions 13 of the yokes by any suitable uniting operation. By way of example, in Fig. 2 the shank portions 13 are joined to each other by a pair of longitudinal welded seams 28. Of course, in practice one of the yokes would be assembled over the coupling 16 and over one of the power shafts, and it would be welded, before assembling the other yoke. After the half-yoke members have been secured together around the power shafts, the completed yokes may be secured to the shafts, if desired, in any suitable manner, such as by bolting, riveting or staking them together. However, in some types of machinery where neither high rotating speeds nor great strains are encountered, it may be unnecessary to directly secure the yokes to the power shafts, and in such cases it may be satisfactory merely to slide the shank portions 13 of the yokes 10 over the adjacent end portions of the power shafts.

It is evident that the shank portions 13 of the yokes 10 may be suitably shaped to fit over either round or square power shafts, or shafts having any other cross-sectional configuration. Yokes designed for one type of shaft may be fitted onto shafts having other configurations by inserting suitable adapters into the shank portions of the yokes, in a well known manner. These adapters may be appropriately keyed, slotted or splined for attachment to any particular power shaft. The yokes and their adapters may then be securely fastened to the power shafts, as by being bolted, pinned or staked thereto. Illustrative of the principles of the invention, in Fig. 2 the paired half-yoke members 12 are properly shaped to fit onto a shaft of square cross-section.

Fig. 6 shows a universal joint embodying a modification of the construction and method of assembly. In order to demonstrate the adaptability of universal joints embodying the invention, a yoke 30 shown on the right-hand side as viewed in Fig. 6 is designed to fit onto power shafts of round cross-section, and a yoke 32 shown on the lefthand side of this view is designed to fit onto power shafts of square cross-section. As in the case of the yokes 10 described in the first embodiment of the invention, the yoke 30 is made up of a pair of mated half-yoke members, of which only one member 33 appears in Fig. 6. Similarly, the yoke 32 comprises a pair of cooperating half-yoke members 34 joined longitudinally. The yokes 30 and 32 are provided with bifurcated ends 36 at one end thereof, which ends pivotally engage opposite sides of a cross-shaped coupling 38 inserted therebetween. At the other end of the yokes 30 and 32, united shank portions 40 are provided for covering and engaging the adjacent ends of a pair of power shafts 41. These shafts may be of the type commonly employed in light farm machinery, such as irrigation pumps, etc.

In this modification of the invention a circular collar 42 is mounted slidably for uniting the half-yoke members, such as the member 33, of the yoke 30, and the half-yoke members 34 of the yoke 32 are joined together by a slidably mounted square collar 44. In other respects, such as the provision of rounded bearing surfaces on the arms of the inserted coupling, the two described embodiments of the invention correspond. Hence, the principal feature of the second embodiment of the invention is that the universal joint may be quickly assembled and disassembled by utilizing the slidable collars, or equivalent clamping members, when no permanent coupling is needed.

In assembling this universal joint, it is merely necessary to place the collars 42 and 44 on the adjacent ends of the power shafts, then pair and place the half-yoke members 33 and 34 in engagement with the ends of tthe shafts and also with the cross-shaped coupling 38, in the same manner as described for the first embodiment of the invention. Finally, the collars 42 and 44 may be moved longitudinally along the shafts to cover and unite the ends of the shank portions 40 of the yokes 30 and 32. Thus, in this embodiment no welded seam or other permanent connection is employed.

In the second modification of the invention, shown in Figs. 7 and 8, the entire universal joint may be constructed from sheet metal stampings, or the equivalent thereof. A cross-shaped coupling 50 is formed from a mated pair of half sections 52, best shown in Fig. 8, which are made of sheet metal stampings and are united as by welding. The coupling 50 is provided with four tubular arms 54 projecting outwardly at right angles to each other. The outer end of each tubular arm 54 is covered by a circular cap 56, which is also stamped from sheet metal. A ball bearing 58 may be present, and in such case each cap 56 is shaped to provide a bearing seat therefor. The ball bearings 58 minimize friction while still providing the required torque load surface. Each ball bearing 58 is engaged by a portion of a yoke 60, corresponding to the yokes 10 and 30 of the previously described embodiments of the invention. The yoke 60 may likewise be fabricated by stamping it in two mating sections from sheet metal, and these sections may be provided with suitable shank portions for engagement with power shafts, in the same manner described for the other embodiments of the invention. Although the ball bearings 58 present superior bearing surfaces, these ball bearings may be omitted in some cases to form the universal joint entirely from sheet metal stampings.

Universal joints embodying the invention offer important advantages over the devices available heretofore. Particularly important are the inexpensiveness and simplicity of the construction and assembly of such joints. The entire unit is light in weight, and yet it is sufficiently strong for most practical applications. Although the half-yoke members may be formed by stamping them from sheet metal, relatively heavy gage steel sheets may be employed to provide structural rigidity and strength in the completed joint. Furthermore, the sheet metal may be selected on the basis of calculated strain and load requirements to fail or rupture when a predetermined maximum load is placed on the joint, thereby preventing damage to expensive machinery. Upon such failure, the inexpensiveness and simplicity of the joint enables it to be replaced economically and rapidly. Obviously, the entire universal joint assembly may be readily made in a variety of sizes, and its specifications may be varied with ease to suit special requirements.

It will be apparent to those skilled in the art that various changes may be made without departing from the spirit of the invention, and therefore the invention is not limited to what is shown in the drawings and described in the specification, but equivalent expedients should be considered as being within the scope of the invention, as defined by the appended claims.

I claim:

1. A universal joint for coupling the adjacent ends of a pair of power shafts, comprising a pair of yokes having a shank end and a bifurcated end, each of said yokes comprising a pair of mated sheet metal half-yoke members, each of said members having a shank portion at one end thereof connected by an inclined bridge portion with an offset head formed at the other end thereof and having indentations formed on opposite sides of the bridge portion, said heads forming the bifurcated ends of the yokes when the members are mated, a cross-shaped coupling having four tubular arms projecting outwardly at right angles to each other to form oppositely disposed pairs of aligned trunnions, said yokes being mounted with their bifurcated ends in pivotal engagement with the trunnions of the coupling and with their shank portions encasing the adjacent ends of the power shafts, the ends of the power shafts abutting the indentations on the bridge portions of the half-yoke members, each of said heads having a semispherical indentation fitted directly over the open end of the tubular arms of the coupling, said heads and trunnions having mating rounded bearing surfaces, and means for joining together the shank portions of the mated half-yoke members.

2. The invention defined by claim 1 in which the shank portions of the paired half-yoke members are permanently united by longitudinally welded seams.

3. The joint defined by claim 1 in which the shank portions of the paired half-yoke members are detachably united by longitudinally slidable collars removably mounted thereon.

4. A universal joint for coupling power shafts, comprising a pair of yokes having a shank end and a bifurcated end, each of said yokes comprising a mated pair of stamped sheet metal half-yoke members having an offset head at one end thereof for forming the bifurcated end of the yokes when mated, a cross-shaped metallic coupling having four tubular arms projecting outwardly at right angles to each other to form oppositely disposed pairs of aligned trunnions, said coupling comprising a united pair of half sections stamped from sheet metal, each of the tubular arms of the coupling having a stamped sheet metal cap covering the end thereof, a plurality of ball bearings for the trunnions, one of said ball bearings being mounted on each of the metal caps, said yokes being mounted with their bifurcated ends pivotally engaging the ball bearings on the trunnions of the coupling and with their shank portions encasing the adjacent ends of the power shafts, and means for joining together the shank portions of the mated half-yoke members.

References Cited in the file of this patent

UNITED STATES PATENTS

| | | |
|---|---|---|
| 478,811 | Oehring | July 12, 1892 |
| 1,093,822 | Blum | Apr. 21, 1914 |
| 1,232,540 | Hartmann | July 10, 1917 |
| 2,067,282 | Padgett | Jan. 12, 1937 |
| 2,783,626 | Klomp | Mar. 5, 1957 |